(No Model.) 2 Sheets—Sheet 1.
S. PEARSON.
NECK YOKE CENTER.
No. 548,326. Patented Oct. 22, 1895.
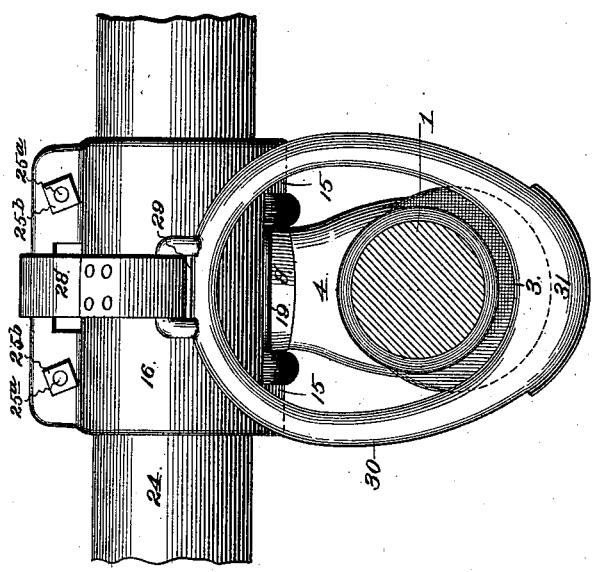
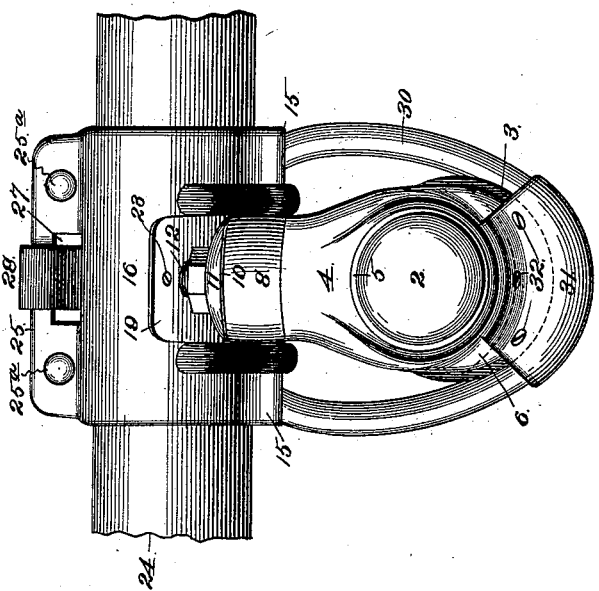
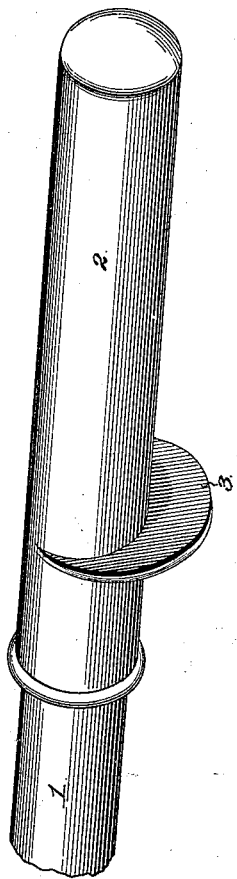
Witnesses
Inventor
Swain Pearson,
By Higdon & Higdon
Attys.

(No Model.) 2 Sheets—Sheet 2.
S. PEARSON.
NECK YOKE CENTER.
No. 548,326. Patented Oct. 22, 1895.
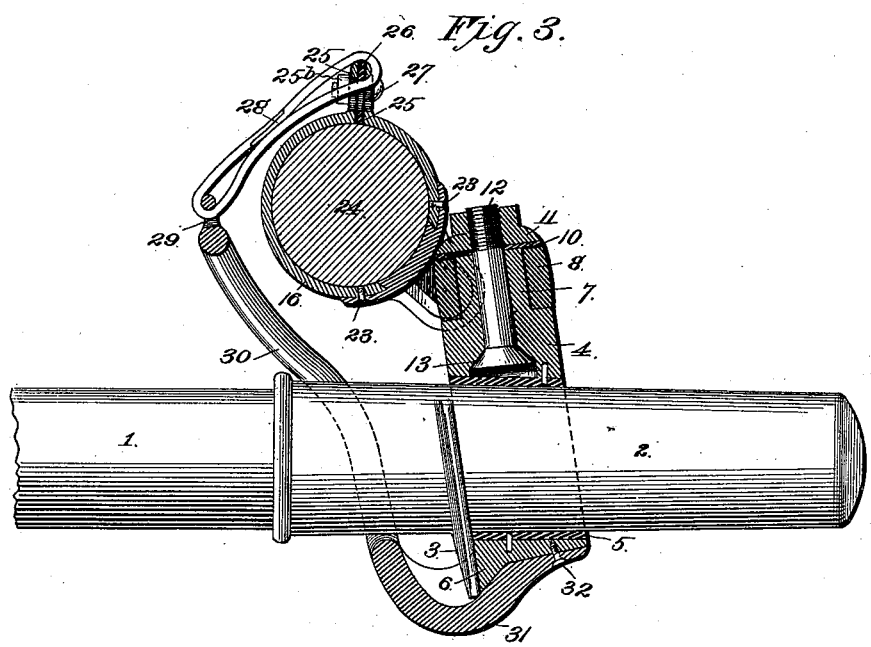
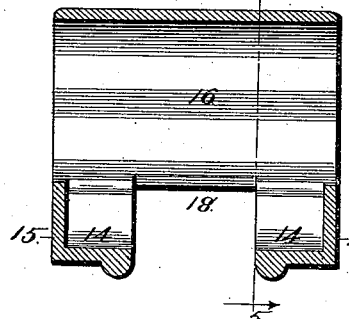
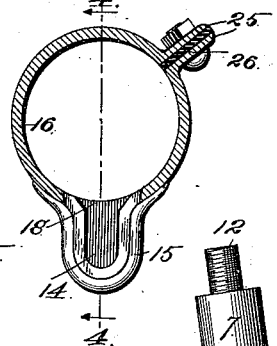
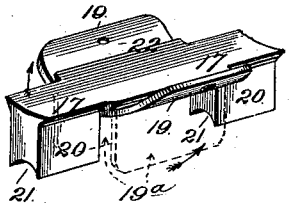
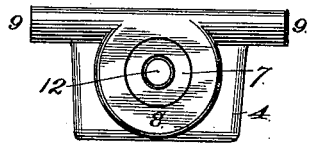
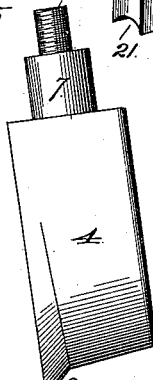
Witnesses:
Inventor:
Swain Pearson,
By Hyman & Hyman
Attys.

UNITED STATES PATENT OFFICE.

SWAIN PEARSON, OF OKLAHOMA, OKLAHOMA TERRITORY, ASSIGNOR TO ANNA PEARSON, OF SAME PLACE.

NECK-YOKE CENTER.

SPECIFICATION forming part of Letters Patent No. 548,326, dated October 22, 1895.

Application filed February 16, 1895. Serial No. 538,641. (No model.)

*To all whom it may concern:*

Be it known that I, SWAIN PEARSON, of Oklahoma, Oklahoma county, Territory of Oklahoma, have invented certain new and useful Improvements in Neck-Yoke Centers, of which the following is a full, clear, and exact description, reference being had to the accompanying drawings, forming a part thereof.

My invention relates to neck-yoke centers; and the object of the same is to provide a device of this character which will make it impossible for the tongue and the neck-yoke bar to become disconnected.

A further object is to produce a neck-yoke center which combines simplicity, strength, durability, and inexpensiveness of construction with perfect freedom and independence of pivotal motion.

With these objects in view the invention consists in certain novel and peculiar features of construction and combinations of parts, as will be hereinafter described and claimed.

In order that the invention may be fully understood, I will proceed to describe it with reference to the accompanying drawings, in which—

Figure 1 represents a front view of a neck-yoke center embodying my invention as applied in operative position relative to the tongue and the neck-yoke bar of a vehicle. Fig. 2 represents a rear view of the same, the tongue being shown in section. Fig. 3 represents a vertical central section of the same. Fig. 4 represents a section taken on the line 4 4 of Fig. 5. Fig. 5 represents a section taken on the line 5 5 of Fig. 4. Fig. 6 is a detail perspective view of the key, to be hereinafter described. Fig. 7 is a plan view of the collar which embraces the tongue and of the swivel member or section which operatively connects said collar and the sleeve or collar carried by and embracing the neck-yoke bar. Fig. 8 is a side elevation of the collar which embraces the tongue. Fig. 9 is a perspective view of a portion of the tongue, showing thereon the wear sleeve or casting.

In the said drawings, 1 designates a portion of the tongue of a vehicle, and 2 designates a metallic sleeve or casting embracing and secured rigidly upon the same, which is provided with a depending crescent-shaped flange 3.

4 designates a collar, which is provided with a lining 5, of rawhide or any other suitable material which protects said collar from wear, as said collar embraces snugly the sleeve or casting 2 upon the tongue forward of the flange 3 thereof. Said lining is preferably secured in place by pins, as shown in Fig. 3, or may be secured in any other suitable manner. The collar 4 is provided with a depending crescent-shaped shoulder 6 at its rear side to provide a face for frictional contact of practically the same size as the flange 3, against which it snugly fits, that wear on these parts may be equal or uniform. Said collar at its upper end is provided with a cylindrical boss or arm 7. A swivel member comprises a sleeve 8, which rotatably embraces the said cylindrical boss or arm 7 and the lateral and horizontally projecting trunnions 9. The pivotal connection between the collar and said swivel member is made secure by means of the washer 10, of brass or other suitable material, which rests upon the same, the nut 11, and the bolt 12, engaged by said nut and projecting axially through the cylindrical boss or arm 7. Said bolt is provided at its inner end with an enlargement or head 13, which engages a cavity in said collar and holds it securely in position. The cylindrical trunnions 9 of the swivel member or section are pivotally mounted in bearing-cavities 14 of the offsetting lugs 15 of the sleeve or collar 16, and are locked from any but pivotal movement in said bearing-cavities by means of a key. This key comprises an elongated body portion 17, which closes the elongated aperture 18 in said sleeve, said aperture corresponding or slightly exceeding in length the said swivel member or section. The body portion 17 of said key is dovetailed into said aperture, and its upper and inner surface is curved and continues concentric with the inner surface of said sleeve 16, as shown clearly in Fig. 3. Said key is also provided with laterally-extending wings 19, also concentric with and fitting against the external surface of said sleeve after being secured properly in position, and depending from each end of the body portion 17 are shoulders 20, which are concaved longitudinally, as at 21, in their under surface, so as to form practically a bearing-cap for the trunnions 9 of the swivel member or section hereinbefore referred to. In securing said parts in their proper relative positions the swivel member is passed within the sleeve 16 and the sleeve 8 of said member projected through the aperture 18 until the trunnions 9 find a bearing in said cavities 14. The wings of the key, before it is secured in position, depend from the body portion, as shown in dotted lines at 19ª, and the key is placed in position by slipping it within the sleeve 16 and then forcing it downward until the portion 17 dovetails into the aperture 18. The shoulders or bearing-caps 20 are contiguous to the trunnions 9 of the swivel member and the wings 19 protrude through said aperture 18. Said wings are now bent upwardly in the direction indicated by the arrows, Fig. 6, to the position shown in full lines, and fit snugly against the sleeve 16, as before described. These wings are provided with apertures 22, which register with apertures in the sleeve, and extending through said registering apertures are screws 23, which engage a yoke-bar 24, which fits snugly within said sleeve and is adapted to be connected to the yoke upon the draft-animals in the usual or any preferred manner. The key, of course, may be constructed of any suitable metal or material which will permit the wings to be bent or manipulated as described, though it is to be understood that the wings may be dispensed with, as the dovetail connection will prevent the key from moving outward and unduly clamping the swivel member and the neck-yoke bar 24 will prevent any inward movement of the same. I prefer, however, to use these wings as an integral part of the key.

It will be apparent that the construction so far described will permit a certain amount of lateral and pivotal or universal movement between the neck-yoke bar and the tongue.

In order that the sleeve 16 may fit neck-yoke bars of slightly-varying thickness, it is preferably formed in the shape of a spring-clasp, and is provided with outwardly-projecting flanges 25 at its contiguous margins, and the filling of leather 26 may be placed between said flanges or not, according to the size of the neck-yoke bar. Extending through registering apertures in said flanges and in the interposed filling 26 are bolts 25ª, and engaging the threaded ends of the same are nuts 25ᵇ, which are adapted to clamp the sleeve or clasp tightly upon the neck-yoke bar. Said flanges and said filling are also provided with an aperture 27, through which is slipped one end of a strap 28. The other end of said strap 28 is slipped through an opening 29, formed in an annulus 30, which surrounds the front end of the tongue or rather the sleeve 2 thereof. The lower end of said annulus is provided with an arm 31, which extends below and contiguous to the flange 3 of said sleeve, and is secured by screw-bolts 32 or any other suitable means to the lower side or end of the collar 4.

It will be apparent, should the swivel member or section become broken or otherwise detached from the collar 4 or from the sleeve 16, that the tongue cannot drop at its front end, owing to the fact that it will be held up by the supporting-annulus 30, thereby obviating accidents, which frequently occur because of the disconnection between the tongue and the neck-yoke bar. It will also be apparent, in the event of any of the tugs or traces becoming broken or detached from the singletree when the vehicle is in motion, that the arm 31, which curves or flanges upward in rear of the flange 3 of the tongue-sleeve, will come in contact with the same, and will consequently prevent the dropping of the front end of the tongue.

To secure the collar 4, by which the annulus 30 is carried properly upon the tongue, so that said annulus shall be rearward of the flange 3, it is necessary that it should be inverted and then slipped upon the sleeve until the flange thereof has passed through the annulus. The collar is then rotated upon the sleeve until it fits snugly and squarely against the front side of the flange, as illustrated. This inversion of the collar is necessary when securing it in position, because the arm or flange 31 of the said annulus could not otherwise pass the flange 3 of the tongue-sleeve 2, as will be understood. In removing the yoke-center this operation is reversed.

The swivel connection permits a free up-and-down and lateral motion to either side to accommodate the vibration of the tongue and of the neck-yoke bar and when the vehicle is turning to one side or the other.

From the above description it will be apparent that I have produced a neck-yoke center which obviates accidents in a large degree by absolutely insuring against the dropping of the tongue to the ground.

Having thus described my invention, what I claim as new, and desire to secure by Letters Patent, is—

1. A neck-yoke center comprising a collar to embrace the tongue of a vehicle, a sleeve to embrace the neck-yoke bar, a swivel-member comprising trunnions pivotally connected to operate in a vertical plane to said sleeve, a sleeve which is pivotally connected to operate laterally or in an approximately horizontal plane to the said collar, a key carried by said sleeve which locks the trunnions of the swivel-member from any but pivotal motion, a bolt carried by said collar, and a nut engaging said bolt to secure the connection between the sleeve of the said swivel-section and the said collar, substantially as set forth.

2. In combination, a flanged tongue of a vehicle, and a neck-yoke center comprising a collar mounted on the said tongue and bearing against the flange of the same, a sleeve mounted on the neck-yoke bar, a swivel-member connecting said sleeve and said collar so as to permit of movement both up-and-down and to each side, an annulus carried by said collar surrounding the tongue, and pivotally connected to the sleeve of the yoke-bar, substantially as set forth.

3. In combination, a flanged tongue, a neck-yoke bar, and a neck-yoke center comprising a collar mounted upon said tongue, and bearing against the flange of the same, a sleeve mounted upon the neck-yoke bar, a swivel-member connecting said sleeve and said collar so as to permit of movement both up-and-down and to each side, an annulus surrounding the tongue and looped at its upper end by a strap to the neck-yoke sleeve, and provided at its lower end with an arm which is secured to the said collar and curves up in rear of the said tongue-flange, substantially as and for the purpose set forth.

In testimony whereof I affix my signature in the presence of two witnesses.

SWAIN PEARSON.

Witnesses:
 SWAN. MARTIN,
 GEO. W. SCHULER.